United States Patent
Stinnett et al.

(10) Patent No.: US 7,510,225 B1
(45) Date of Patent: Mar. 31, 2009

(54) COMBINED MANURE FORK AND FAN-TYPE SHAVINGS BLOWER

(76) Inventors: Rosemarie Stinnett, 3433 Fargo Ave., Lake Worth, FL (US) 33467; Lee Stein, 3433 Fargo Ave., Lake Worth, FL (US) 33467

( * ) Notice: Subject to any disclaimer, the term of this patent is extended or adjusted under 35 U.S.C. 154(b) by 52 days.

(21) Appl. No.: 11/731,152

(22) Filed: Mar. 31, 2007

(51) Int. Cl.
*A01D 9/00* (2006.01)

(52) U.S. Cl. .......................... 294/59; 294/51; 294/55.5; 15/405

(58) Field of Classification Search .................. 294/59, 294/51, 55.5, 57; 15/404, 405; 56/400.01, 56/400.04, 400.08
See application file for complete search history.

(56) References Cited

U.S. PATENT DOCUMENTS

| | | | |
|---|---|---|---|
| 3,999,243 A | * | 12/1976 | La Pour ........................ 15/344 |
| 4,734,017 A | * | 3/1988 | Levin .......................... 417/366 |
| 4,945,604 A | * | 8/1990 | Miner et al. ................... 15/344 |
| 5,417,044 A | | 5/1995 | Russo |
| 5,799,998 A | | 9/1998 | Gitterman |
| D406,413 S | | 3/1999 | Russo |
| 6,105,206 A | * | 8/2000 | Tokumaru et al. .............. 15/344 |
| 6,474,267 B1 | | 11/2002 | Padgett |
| 6,494,514 B1 | | 12/2002 | Stinnett et al. |

* cited by examiner

*Primary Examiner*—Dean J Kramer
(74) *Attorney, Agent, or Firm*—J. E. McTaggart

(57) ABSTRACT

For conserving bedding material such as wood shavings when cleaning livestock environments such as horse stalls, a lightweight manure fork, specially configured with an open flat working region with relatively short tines, is combined with a highly efficient fan-type blower unit attached to the handle. Delivering air-flow onto the tined working region in short blasts under finger control, the worker simply manipulates the fork in the normal manner to remove the manure; the loose bedding material is blown off the fork and back onto surrounding regions of the stall, thus saving a substantial portion of the usual replenishment costs. The invention thus accomplishes substantial overall cost savings and environmental conservation without requiring special supervision, unusual diligence, effort or skill on the part of the worker.

18 Claims, 4 Drawing Sheets

COMBINED MANURE FORK AND FAN-TYPE SHAVINGS BLOWER

FIELD OF THE INVENTION

The present invention relates to the field of hand-held material-handling implements and more particularly to a combined manure fork and fan-type shavings blower that, in the cleaning of livestock facilities such as horse stables, separates wood chip bedding material from manure being removed, so that the bedding material can be conserved and recycled.

BACKGROUND OF THE INVENTION

Manual cleaning of horse stalls or other livestock facilities, as conventionally practiced, is typically performed utilizing a commercially-available specially-shaped fork consisting of a scoop portion configured with a row of extending tines, typically molded from plastic, and a handle attached to the scoop portion. In conventional practice of stall cleaning, there is substantial waste because much of the wood shaving bedding material becomes removed and discarded along with the manure, thus necessitating frequent costly replenishment that can amount to many bags of shavings per week per animal, representing a substantial cost factor.

The main approach presently available to control this cost factor is to train, motivate and supervise workers to take the extra time and diligent effort to salvage the wood shavings; however such special training and effort is likely to be merely a tradeoff, shifting the cost to labor and supervision, and could result in zero or negative savings overall. The cost of wasted bedding material is particularly high in prestigious operations and expensive boarding sites where the stalls must be kept in top condition by frequent cleaning and where wood shavings are utilized plentifully for aesthetic and show purposes.

DISCUSSION OF KNOWN ART

U.S. Pat. No. 6,494,514 to the present inventors discloses a COMBINED MANURE FORK AND SHAVINGS BLOWER that has been trademarked as EZ PIKINS AIR FORK and that utilizes a centrifugal type blower connected via a tubular duct in closed airflow communication with a flared duct portion of the fork assembly.

OBJECTS OF THE INVENTION

It is a primary object of the present invention to provide an improved combination manure fork and blower for cleaning livestock stalls and pens, that automatically and effectively separates bedding material such as wood shavings during the process of stall cleaning so that the bedding material can be retained and recycled repeatedly.

It is a further object that any mechanism incorporated in the improved manure fork be made to operate in a manner that there is no excessive sound or other disturbance that could frighten or alarm nearby livestock.

It is a further object that the improved manure fork be made to operate safely without requiring an AC power line cord and without exposing the user or livestock to risk of electrical shock.

It is a further object that any motor driven mechanism including associated batteries be made especially small and light in weight so to minimize the manual work effort required in stall-cleaning activity.

SUMMARY OF THE INVENTION

The present invention combines a manure fork with a fan type air blower that is directed in a improved manner over previous such devices to blow bedding material such as wood shavings off the fork and back into surrounding regions of the stall automatically and efficiently while the worker simply performs the cleaning operation and removes the manure in the normal manner. The wood shavings are then easily recycled into the stall, thus saving a substantial portion of the conventional replenishment costs without imposing extra diligence on the part of the worker or extra supervision on the part of the supervisor.

Electrical powering of the blower keeps the operation quiet so as to not startle the horse or other livestock. Instead of operating the blower from the AC power line, on-board rechargeable battery operation is utilized to avoid the potential nuisance factor of an AC line cord and to eliminate any risk of electrical shock. Using a finger-controlled momentary switch to energize the blower in short bursts enables the air fork to efficiently clean up to eight or more stalls on a single charging of the battery.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
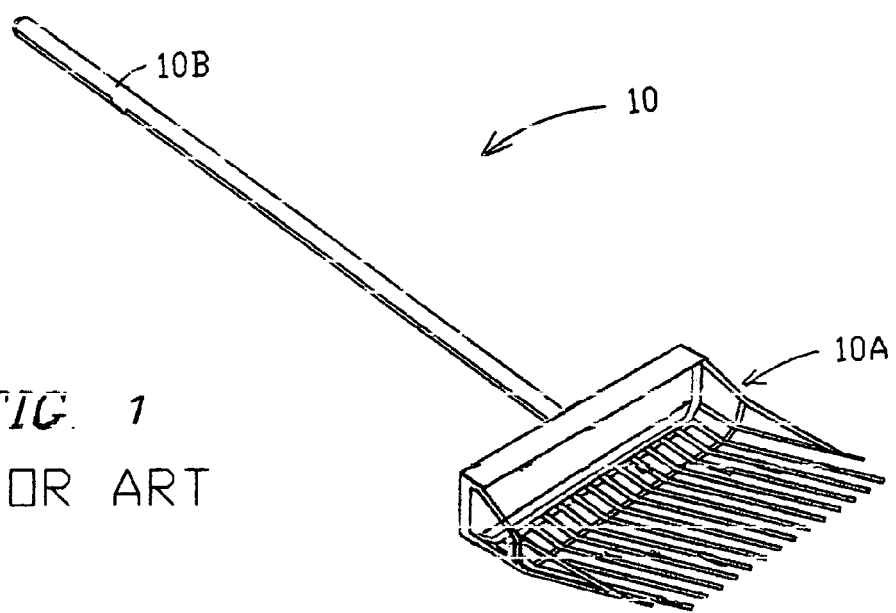
FIG. 1 is a perspective view of a conventional manure fork used for cleaning stalls.

FIG. 1 is a perspective view of a conventional manure fork 10 used for cleaning stalls. Typically a tined portion 10A, with an open structure as shown, is attached to a handle 10B.

Figure 2:
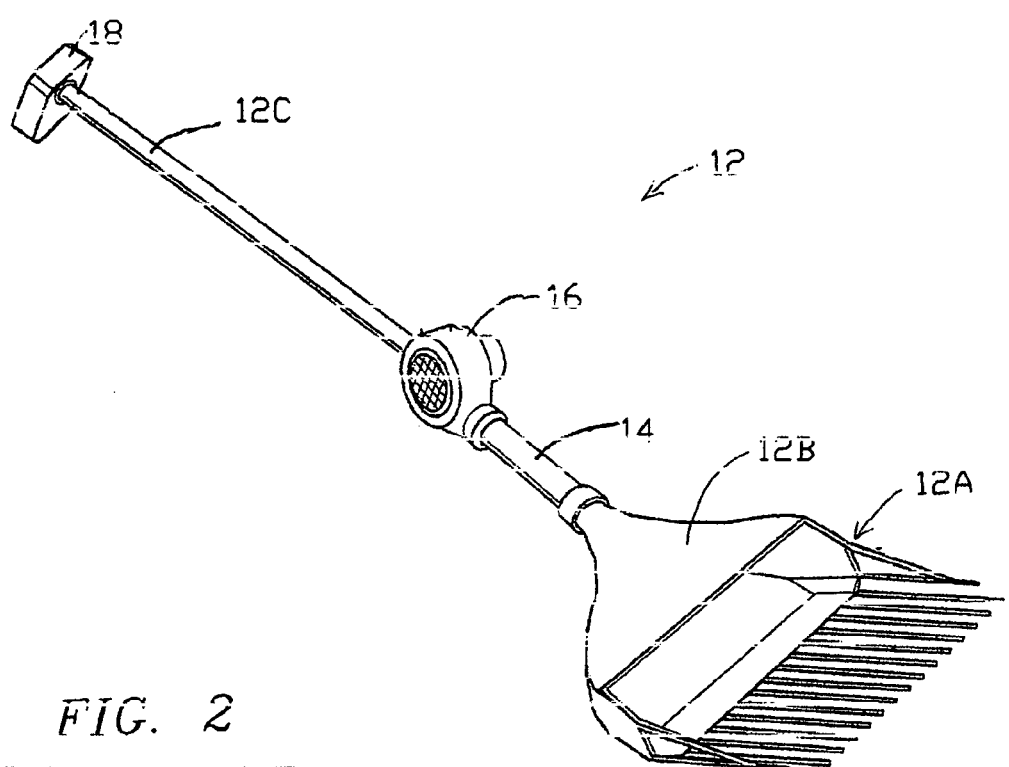
FIG. 2 is a perspective view showing deployment of a previous version of the EZ PIKINS AIR FORK™ equipped with a centrifugal blower.

FIG. 2 is a perspective view of an air fork 12 of a type cited above under DISCUSSION OF KNOWN ART, wherein the modified tined portion 12A is configured with a flared shroud 12B connected via tubular duct 14 to receive the air flow output of a centrifugal air blower 16 attached to handle 12C and delivering the airflow to the tined portion 12A. The motor of blower 16 is powered from a rechargeable battery 18 attached at the upper end of handle 12C: operation of blower 16 is controlled by a finger-operated push switch on the bottom side of handle 12C, not visible in this view.

Figure 3:
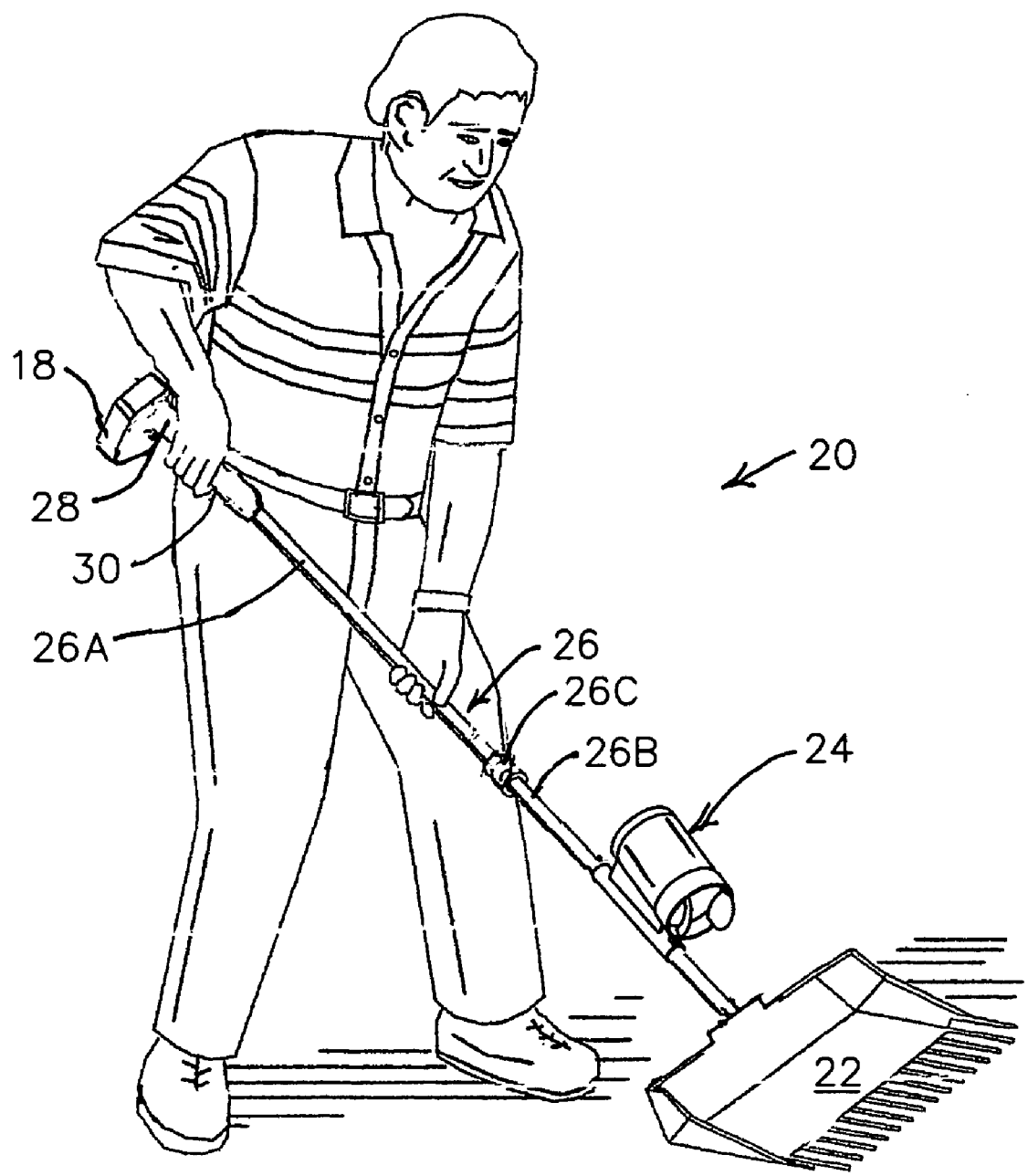
FIG. 3 is a perspective view of an air fork of the present invention utilizing a fan-type blower and an open tined portion with a major solid working region.

FIG. 3 is a perspective view showing deployment of an air fork 20 of the present invention utilizing a special open-shaped tined portion 22 and a fan-type air blower unit 24 mounted on handle 26, which is fitted with a combined battery holder and handgrip 28 at the upper end with battery 18 in place.

Handle 26 is made as two portions 26A and 26B that interact in a telescopic manner to enable the length to be adjusted optimally for an individual user: the selected setting is held locked in place by an annular locking collar 26C.

The battery-holder-handgrip 28 provides mounting for a finger-operated momentary type fan control switch 30 located on the underside for convenient pulsed operation controlled by the user's index finger.

Figure 4:
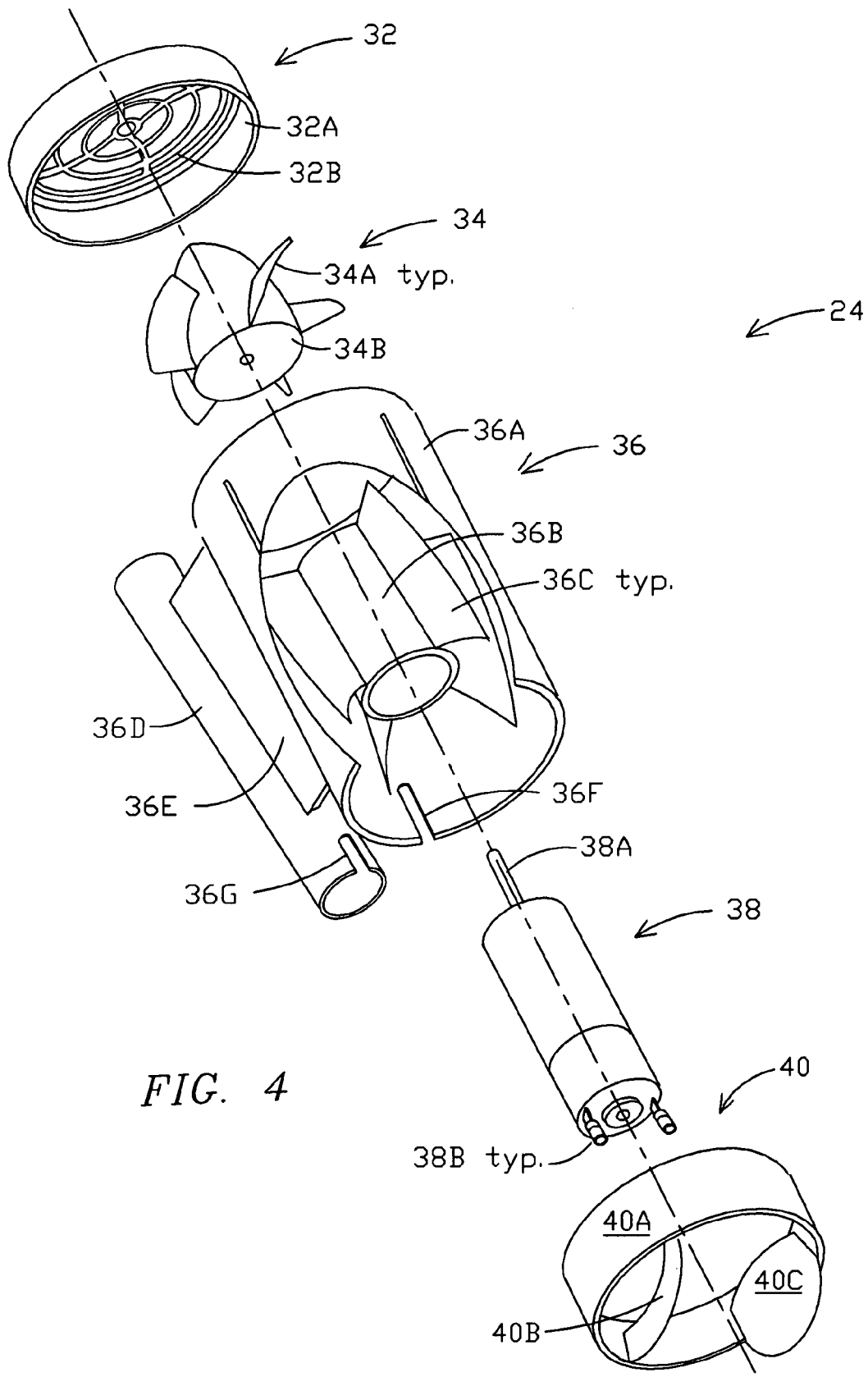
FIG. 4 is an enlarged exploded three-dimensional view of the five main components of the blower assembly of the air fork of FIG. 3.

FIG. 4 is an enlarged exploded three-dimensional view of the five main components of air blower unit 24 of the air fork 20 of FIG. 3.

Intake end member 32 is configured with an annular flange 32A and a protective grille 32B that prevents entry of human fingers or other objects while providing passage for intake air-flow.

Fan 34 is configured with five blades 34A extending radially from hub 34B in a polar array.

Main housing 36 is configured with a tubular outer shell 36A, shown with a portion cut away to reveal a smaller tubular inner sleeve 36B which serves as a close-fitting motor support. Four vanes 36C extend as integrally attached spacers between inner sleeve 36B and outer shell 36A. Vanes 36C are arranged radially in a polar array 90 degrees apart and are oriented in a generally axial direction to allow free air flow past the inner sleeve 36B. A handle attachment sleeve 36D is attached in an offset location beneath outer shell 36A by a parallel pair of strut plates 36E.

D.C. motor 38 is shown oriented with shaft 38A extending for fan mounting at the upper end and a pair of electrical terminals 38B at the lower end.

Outlet end member 40 is configured with an annular flange 40A supporting a pair of specially-shaped air flow deflector plates 40B and 40C.

In assembly, motor 38 is secured in place within inner sleeve 36B, fan 34 is affixed onto motor shaft 38A, located within the upper region of outer shell 36B, and end members 32 and 40 are engaged onto the opposite ends of outer shell 36B. Electric wiring from terminals 38B is fed through slot opening 36F in outer shell 36A, slot opening 36G in sleeve 36D and a corresponding opening in the hollow metal handle 26 (FIG. 3) which serves as a conduit for wiring leading to the control switch and battery.

The direction of rotation of motor shaft 38A and the pitch of fan 34 are chosen to cause air-flow to enter the upper end of outer shell 36A, to flow past the inner sleeve 36B surrounding and holding motor 38, and to exit at the lower end where it is directed onto the tined portion 22 (FIG. 3). Optimal separation of bedding material is accomplished by (a) blower 36 being optimally located relative to tined portion 22 (FIG. 3) by the two strut plates 36E being specially shaped to provide an optimal offset and small angle relative to the handle 26, (b) vanes 36C being located at a small angle from axial to enhance the spiral centrifugal effect of the fan blades 34A, and (c) deflector plates 40B and 40C being shaped and positioned optimally to diverge portions of the air flow at each side outwardly so as blow a substantial portion of the bedding material outwardly and off the two opposite side edges of tined portion 22.

In a preferred embodiment, in blower 24, input end member 32, five blade fan 34, main housing 36 and output end member 38 are injection molded from high impact plastic, each as a single integrated part.

Figure 5:
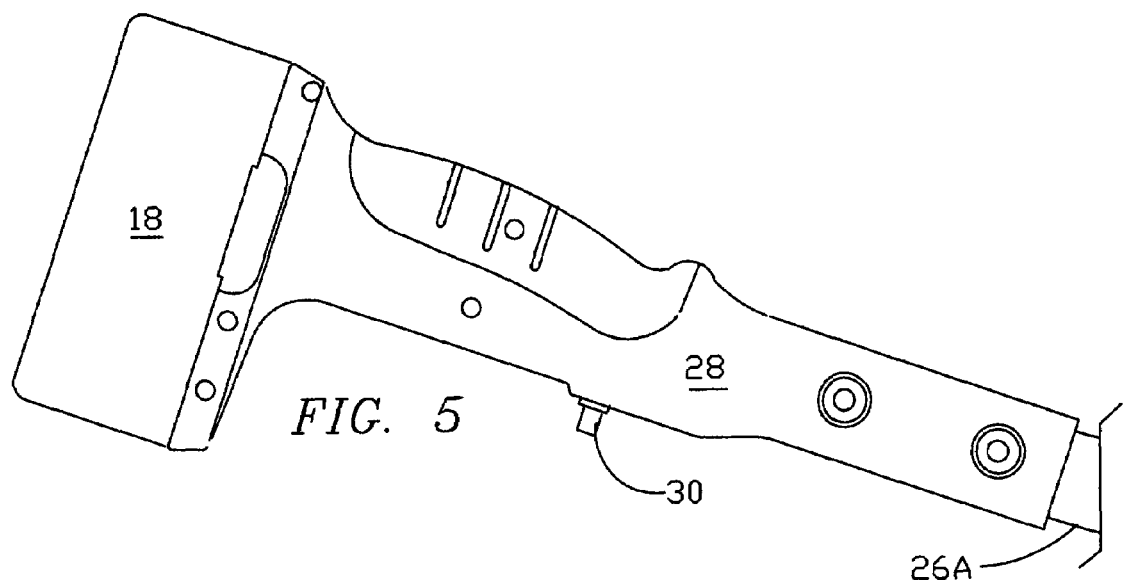
FIG. 5 is a side view of the battery-holder-handgrip of the air fork of FIG. 3 with the battery in place.

FIG. 5 is a side view of the battery-holder-handgrip 28 of the air fork 20 of FIG. 3 with the rechargeable battery 18 held in place by a releaseable latching mechanism.

The battery 18 is of the rechargeable NiCad type utilized in cordless tools such as hand drills, rated at 14.4 volts, 1.5 ampere hours and weighing about 1.5 pounds.

For charging, battery 18 is unplugged from the air fork and plugged into the connector receptacle of a suitably rated mating battery charger unit in the same manner as in cordless tools.

The battery-holder-handgrip 28 may be fabricated as two mating injection molded plastic parts with a vertical central interface plane: a right hand part as shown, and a similar mirror image left hand part, fastened together and fastened securely to the upper end of handle portion 26A.

Figure 6:
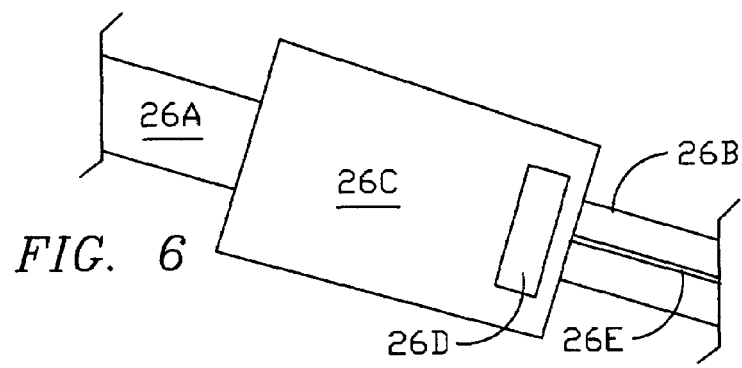
FIG. 6 is a side view of locking-collar of the air fork of FIG. 3, shown in its locked mode for normal use.

FIG. 6 is a side view of locking-collar 26c of the air fork 20 of FIG. 3, shown in its locked mode holding handle portions 26A and 26B locked together for normal use. Finger-operated lever 26D lies in place essentially flush with the rest of the collar in this locked mode.

Figure 7:
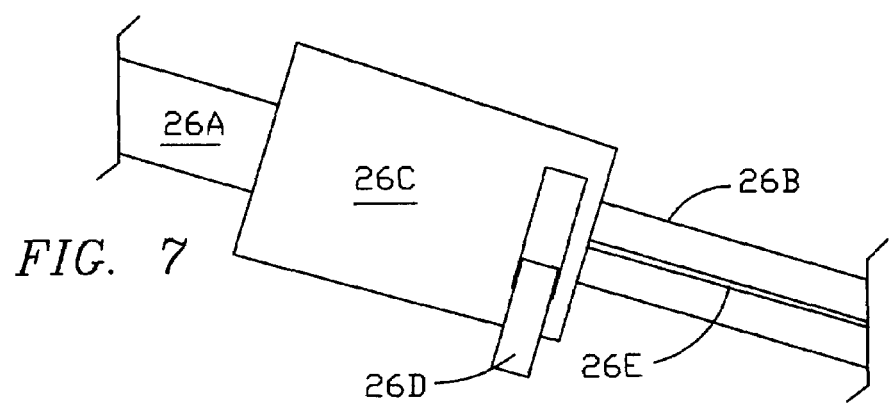
FIG. 7 shows the locking collar of FIG. 6, shown in its released mode for length adjustment.

FIG. 7 shows the locking-collar 26C of FIG. 6 having been finger-operated to its released mode by pulling out lever 26D thus enabling adjustment of handle length by telescopic action between handle portions 26A and 26B, following which the portions may be once again locked in place together by returning lever 26D in a snapping action to its locked working mode as in FIG. 6.

The total weight of the air fork including the battery is only about 4 pounds, due to effective configuration and use of molded plastic parts, aluminum handle, miniature motor and compact battery. This extremely light weight results in high working efficiency.

Cleaning and bedding recycling of eight to ten horse stalls can be completed with the air fork on a single battery charge cycle since the blower does not need to be energized continuously but instead only in intermittent short bursts of a few seconds as required.

As an alternative to the fan location shown in the illustrative embodiment, i.e. on the upper end of the motor shaft facing away from the tined portion, blowing air past the motor, the invention may be practiced with the fan located on the opposite end of the motor shaft. i.e. the end facing the tined portion, drawing air past the motor.

The invention may be practiced with two or more blower units operating in combination.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A combined manure fork and air blower, directed to conservation of bedding material in cleaning of livestock environments, comprising:

a tined portion of the fork in an open configuration with a substantially flat main floor region of which a major portion is made solid and a minor portion extends forward therefrom as a row of tines;

a handle attached to and extending from said tined portion;

at least one fan-type air blower, attached to said handle near said tined portion, made and arranged to generate a sufficient flow of air directed in a manner to blow loose livestock bedding material off said tined portion, thus enabling a worker, manipulating the tined portion in a conventional manner for cleaning the livestock environments, to blow off and recycle the bedding material;

said air blower comprising an electric motor, cylindrical in shape, having a rotational central shaft, and a fan having a plurality of fan blades affixed onto a hub secured onto the central shaft of said electric motor, the fan blades extending radially substantially beyond an outer diameter extent of said electric motor;

a tubular inner sleeve closely surrounding and attached to said electric motor;

a tubular outer shell, co-axially surrounding said motor, made, arranged and dimensioned internally to provide working clearance around said fan and to provide an annular passageway for air-flow associated therewith;

sleeve-to-shell spacer means made and arranged to locate and support said inner sleeve co-axially relative to said outer shell in a manner that allows the air-flow through the annular passageway; and handle-mounting means made and arranged to attach said tubular outer shell to said handle in a location selected to direct the air-flow onto said tined portion in an optimal manner to remove bedding material.

2. The combined manure fork and air blower as defined in claim 1 wherein said motor is oriented so as to be located between said fan and said tined portion, and the blades of said fan are pitched so as to direct air-flow in a direction toward said tined portion.

3. The combined manure fork and air blower as defined in claim 2 further comprising a protective grill, located at an air-flow inlet end plane of said outer shell adjacent to said fan, made and arranged to allow air-flow into said outer shell while preventing access by human fingers.

4. The combined manure fork and air blower as defined in claim 3 wherein said fan is located on said central shaft of said motor at an end region thereof that faces away from said tined portion, such that airflow from said fan flows through said tubular outer shell, past said motor and thence onto the main floor region of said tined portion.

5. The combined manure fork and air blower as defined in claim 2 further comprising a pair of air-flow deflecting plates, located at an air-flow outlet end plane of said outer shell facing said tined portion, configured in an aerodynamically shape and oriented at an angle so as to direct portions of the air-flow from said outer shell onto said tined portion in directions that diverge sideways toward two opposite sides of said tined portion for enhanced action by blowing bedding materials off sideways from the tined portion.

6. The combined manure fork and air blower as defined in claim 5 wherein said pair of air-flow deflecting plates are mounted onto an annular flange made and arranged to fit over an outer shell end region proximal to said tined portion.

7. The combined manure fork and air blower as defined in claim 2 wherein said sleeve-to-shell spacer means comprises a plurality of spacer vanes, extending radially between outer surfaces of said inner sleeve and inner surfaces of said outer shell in a generally longitudinal axial direction.

8. The combined manure fork and air blower as defined in claim 7 comprising four of said spacer vanes disposed radially 90 degrees apart in a polar array.

9. The combined manure fork and air blower as defined in claim 7 wherein each of said spacer vanes is located at a predetermined uniform angle of rotation, relative to a central axis of said outer shell, chosen so as to impart a spiral component into the air-flow pattern with an associated centrifugal effect that tends to diverge the air-flow pattern for enhanced action, blowing bedding materials off sideways from the tined portion.

10. The combined manure fork and air blower as defined in claim 2 wherein:

said inner sleeve, said spacer means, said outer shell and said handle-mounting means are molded together integrally of plastic as a single part; and said handle-mounting means comprises a tubular handle sleeve, made and arranged to fit around said handle and to be fastened thereto, adjoined to said outer shell by a radial strut plate that is configured in a wedge shape so as to provide a predetermined offset angle between central axes of said outer shell and said handle for purposes of optimal air flow direction onto said tined portion.

11. The combined manure fork and air blower as defined in claim 1 further comprising an onboard battery power supply providing electrical power to the motor.

12. The combined manure fork and air blower as defined in claim 11 wherein said onboard battery power supply is a rechargeable battery pack attached and connected by adaptor means located at an end of said handle opposite the end thereof attached to said tined portion.

13. The combined manure fork and air blower as defined in claim 12 wherein said adaptor means comprises a molded plastic combined hand grip and plug-in battery pack holder/connector fitted onto said handle and providing mounting for an on-off switch and providing connector means for readily disconnecting and removing the battery pack from the handle for recharging purposes.

14. The combined manure fork and air blower as defined in claim 1 further comprising a manually operable on-off switch, mounted in a predetermined location along said handle, made and arranged to permit a user to conveniently control operation of the motor.

15. The combined manure fork and air blower as defined in claim 1 wherein:

said air blower comprises a blower housing having a tubular inner sleeve, a tubular outer shell co-axially surrounding the inner sleeve providing therebetween an annular passageway for air-flow, a plurality of spacer vanes constituting said sleeve-to-shell spacer means, extending radially between outer surfaces of said inner sleeve and inner surfaces of said outer shell in a generally longitudinal axial direction so as to not impede the air-flow but oriented at a slight angle to impart a spiral air-flow pattern, a cylindrical shaped electric motor secured in the inner sleeve, the blades of said fan being pitched so as to direct air-flow onto said tined portion; and said air blower further comprises a pair of air-flow deflecting plates, located at an air-flow outlet end plane of said outer shell facing said tined portion, configured in an aerodynamically shape and angularly oriented so as to direct portions of the air-flow from said outer shell onto said tined portion in directions that diverge sideways toward two opposite sides of said tined portion for enhanced action by blowing bedding materials off sideways from the main floor region of the tined portion.

16. The combined manure fork and air blower as defined in claim 15 wherein said spacer vanes are located at a predetermined uniform angle of rotation, relative to a central axis of said outer shell, chosen so as to impart a spiral component into the air-flow pattern with an associated centrifugal effect that tends to diverge the air-flow pattern for enhanced action, blowing bedding materials off sideways from the tined portion.

17. The combined manure fork and air blower as defined in claim 16 wherein:

said inner sleeve, said spacer vanes, said outer shell and said handle-mounting means are molded together integrally of plastic as a single part;

said handle-mounting means comprises a tubular handle sleeve, made and arranged to fit around said handle and to be fastened thereto, adjoined to said outer shell by a pair of strut plates that are each configured in a wedge shape so as to provide a predetermined offset angle between central axes of said outer shell and said handle for purposes of optimal air flow direction onto said tined portion.

18. The combined manure fork and air blower as defined in claim 17 further comprising:

a handgrip, fitted onto an end of said handle opposite the end thereof attached to said tined portion, configured with a battery attachment panel made and arranged to provide battery support and electrical connection;

an onboard rechargeable battery, for providing electrical power to the motor, removably attached to the battery attachment panel; and a momentary type on-off switch, mounted on said handgrip, made and arranged to permit a user to conveniently finger-control operation of the motor.

* * * * *